(12) United States Patent
Aluf-Medina

(10) Patent No.: US 7,924,820 B2
(45) Date of Patent: Apr. 12, 2011

(54) METHOD AND SYSTEM FOR FACILITATING COMMUNICATIONS

(75) Inventor: Mario Aluf-Medina, Nesconset, NY (US)

(73) Assignee: Marron Interconnect LLC, Mamaroneck, NY (US)

( * ) Notice: Subject to any disclaimer, the term of this patent is extended or adjusted under 35 U.S.C. 154(b) by 442 days.

(21) Appl. No.: 11/419,618

(22) Filed: May 22, 2006

(65) Prior Publication Data

US 2007/0127507 A1 Jun. 7, 2007

Related U.S. Application Data

(63) Continuation-in-part of application No. 11/295,977, filed on Dec. 7, 2005, now abandoned.

(51) Int. Cl.
*H04L 12/66* (2006.01)
*H04L 12/28* (2006.01)

(52) U.S. Cl. .................................. 370/352; 370/401

(58) Field of Classification Search .......... 370/351–356, 370/400, 401
See application file for complete search history.

(56) References Cited

U.S. PATENT DOCUMENTS

| | | | |
|---|---|---|---|
| 6,069,890 A * | 5/2000 | White et al. .................. 370/352 |
| 6,243,374 B1 | 6/2001 | White et al. | |
| 6,539,077 B1 | 3/2003 | Ranalli et al. | |
| 6,594,254 B1 | 7/2003 | Kelly | |
| 6,674,745 B1 * | 1/2004 | Schuster et al. .............. 370/352 |
| 6,757,250 B1 | 6/2004 | Fayad et al. | |
| 6,772,210 B1 | 8/2004 | Edholm | |
| 6,810,034 B1 | 10/2004 | Brand | |
| 6,826,174 B1 | 11/2004 | Erekson et al. | |
| 6,928,154 B1 | 8/2005 | Cheaito et al. | |
| 7,027,582 B2 * | 4/2006 | Khello et al. ............. 379/220.01 |
| 7,246,154 B1 * | 7/2007 | Sitaraman et al. ............. 709/217 |
| 7,260,207 B2 * | 8/2007 | Marsico ................... 379/220.01 |
| 7,440,456 B2 * | 10/2008 | Furukawa et al. ............ 370/392 |
| 7,508,819 B2 * | 3/2009 | Kobayashi et al. ............ 370/352 |
| 2001/0028642 A1 * | 10/2001 | Veschi ........................ 370/352 |
| 2001/0049746 A1 | 12/2001 | Shin | |
| 2002/0095516 A1 | 7/2002 | Nada | |
| 2003/0002476 A1 * | 1/2003 | Chung et al. .................. 370/352 |
| 2003/0095542 A1 * | 5/2003 | Chang et al. ................. 370/352 |
| 2003/0215079 A1 | 11/2003 | Watanabe | |
| 2004/0081141 A1 | 4/2004 | Chen et al. | |
| 2004/0131053 A1 | 7/2004 | Sjolund et al. | |

FOREIGN PATENT DOCUMENTS

| | | |
|---|---|---|
| EP | 0 881 812 A | 12/1998 |
| JP | 2001-111624 | 4/2001 |
| JP | 2003 152890 | 5/2003 |
| JP | 2003 198724 | 7/2003 |
| JP | 2003 264644 | 9/2003 |

* cited by examiner

*Primary Examiner* — Hong Cho
(74) *Attorney, Agent, or Firm* — Gottlieb, Rackman & Reisman, P.C.

(57) ABSTRACT

An Internet-based system provides substantially instantaneous communication between two devices for exchanging voice and multimedia signals. The system includes ISP gateways with unique IDs that service a plurality of devices with unique telephone numbers. The system further includes a directory which correlates the devices with ISP gateways. More specifically, the directory includes a RELATIVE records/words/cells in a RANDOM ACCESS TABLE (RRAT) with each entry being identified by a record number, which in this case corresponds to the telephone numbers (as they are or in reverse). The entry relates directly or indirectly the telephone number with the respective ISP gateway. Communication is established by having the ISP gateway of the calling device looking up the ISP gateway of the called device in the directory using the telephone number of the called device. The ISP gateway then generates a handle for the called ISP and uses the handle to establish a communication channel between two devices quickly and efficiently.

22 Claims, 4 Drawing Sheets

PRIOR
ART

PRIOR
ART

Figure 4

Table A
RANDOM ACCESS RELATIVE Phone Number Conversion

| Record/Word Number | ISP Gateway Number |
|---|---|
| 0000000000 | 1001 |
| 0013341538l5 | 9999 |
| 2129998000 | 2005 |
| 2133427623 | 3017 |
| 3177334567 | 4072 |
| 6572324329 | 5056 |
| 8008881234 | 2005 |
| 9178889000 | 5056 |
| 9999999999 | 1001 |

Table B
ISP Gateway Conversion Table

| Record/Word Number | ISP Gateway IP Address | Additional information for the connection handle |
|---|---|---|
| 1001 | 101.111.111.111 | |
| 2005 | 102.111.222.121 | |
| 3017 | 103.107.254.36 | |
| 4072 | 69.70.71.72 | |
| 5056 | 112.213.6.5 | |
| 9999 | OTHER CD | |

Table C
Phone Numbers Database

| Phone Number Indexed | ISP Gateway Number | Additional Information for the Phone Number |
|---|---|---|
| 0000000000 | 1001 | |
| 2129998000 | 2005 | |
| 2133427623 | 3017 | |
| 3177334567 | 4072 | |
| 6572324329 | 5056 | |
| 8008881234 | 2005 | |
| 9178889000 | 5056 | |
| 9999999999 | 1001 | |

METHOD AND SYSTEM FOR FACILITATING COMMUNICATIONS

The subject application is a continuation-in-part of commonly assigned application Ser. No. 11/295,977, filed Dec. 7, 2005, and incorporated herein by reference, and now abandoned.

BACKGROUND OF THE INVENTION

A. Field of Invention

This invention pertains to systems providing IP communications over the Internet including VOIP (Voice Over IP) and VIP (Video over IP). More specifically, a system and method is described that provides efficient IP (VOIP, VIP etc. . . . ) communications between various different internet service providers (ISPs).

B. Description of the Prior Art

Providing telephone (and video) communications wholly or partially over the Internet has been found to be advantageous, More and more entities (including large and small businesses, non-profit organizations, state and federal agencies and individuals) have Internet connections, and most of these connections are broadband connections that provide much more bandwidth than dial-up connections. Wireless Internet connections are becoming common, thereby providing an effective means of replacing or at least supplementing cellular communications. Another advantage is that, at least for the moment, Internet communications are governed by less stringent regulations than telephone communications.

Currently VOIP and VIP services are provided by various communication and Internet-related companies, including both conventional telephone carriers making use of Plain Old Telephone Switching (POTS) and Internet Service Providers (ISPs). Competition between these companies for customers is very strong.

A major stumbling block for the spread of VOIP communications is that each user has a telephone line assigned by a telephone company and an Internet connection (such as a Domain Name or IP address) that is separate and unrelated to the user's telephone line. Since there is no centralized directory correlating telephone lines with Internet connections, ISPs can typically establish fast Internet communications only for their own users. In other words, fast Internet communications can be provided only between two customers of the same ISP. For all other connections, the ISPs have to establish hybrid communication lines, e.g., lines including both Internet connections and standard telephone lines and switches including PSTNs (Public Switched Telephone Networks) and PBXs (Private Branch Exchanges). One such system is described in U.S. Pat. No. 6,069,890. Understandably, this approach is much slower than the pure Internet lines, and more expensive.

Another approach is to have the ISP interrogate sequentially various intermediate nodes (including routers and gateways) until a node is found that provides service for a device associated with the requested telephone number. Of course, depending on the distance between the respective nodes, this may be a very slow process.

A further problem faced by ISPs is that each has its own type of equipment and internal protocols; hence, even if a line is established between two subscribers of different ISPs, communication may not take place because of system incompatibilities.

Various schemes have been suggested for overcoming these problems. Most of these schemes involve providing massive data banks correlating telephone numbers and IP addresses. Some of these schemes are described in U.S. Pat. Nos. 6,674,745; 6,772,210; 6,810,034, as well as U.S. Applications S.N. 2003/00024762003/0095542; and 2004/0081141. Some of the other schemes include LNP-Telephone Number Translation, DNS-Domain Name to IP address mapping, ENUM-Electronic Number Mapping, DUNDi-Distributed Universal Number Discovery. However, the problem with all these schemes is that if the data banks contain entries for all the subscribers, the amount of time required to find the proper IP address from a telephone number becomes prohibitive and unacceptable to subscribers who are used to the almost instantaneous response of most POTS switching systems.

SUMMARY OF THE INVENTION

Briefly, our invention is a system for providing IP communications (VOIP, VIP, etc. . . . ) over the Internet including a plurality of ISPs, each ISP providing one or more gateways to the Internet for various devices. The devices may include telephone sets, computers, PDAs, and other typical means used by subscribers to request voice/video or other communication channels to other subscribers.

Preferably, the system includes a central directory. The primary function of the central directory is to correlate a requested telephone number with a specific ISP gateway serving the device associated with the requested telephone number. The central directory may also be used to store SIP URLs and other data elements which maintain information required to communicate between ISP gateways.

Importantly, within the central directory, each listed telephone number is used as a record with an entry associated with each data number. This data at each entry identifies, directly or indirectly, the respective ISP gateway by an Internet designation such as its IP address or SIP URL. This configuration insures that a request by any subscriber for a connection (VOIP, VIP, etc. . . . ) to another subscriber of any ISP is executed quickly and effectively.

BRIEF DESCRIPTION OF THE DRAWINGS

FIG. 4 shows the database structure used in the system of FIG. 1; and

DETAILED DESCRIPTION OF THE INVENTION

Figure 1:
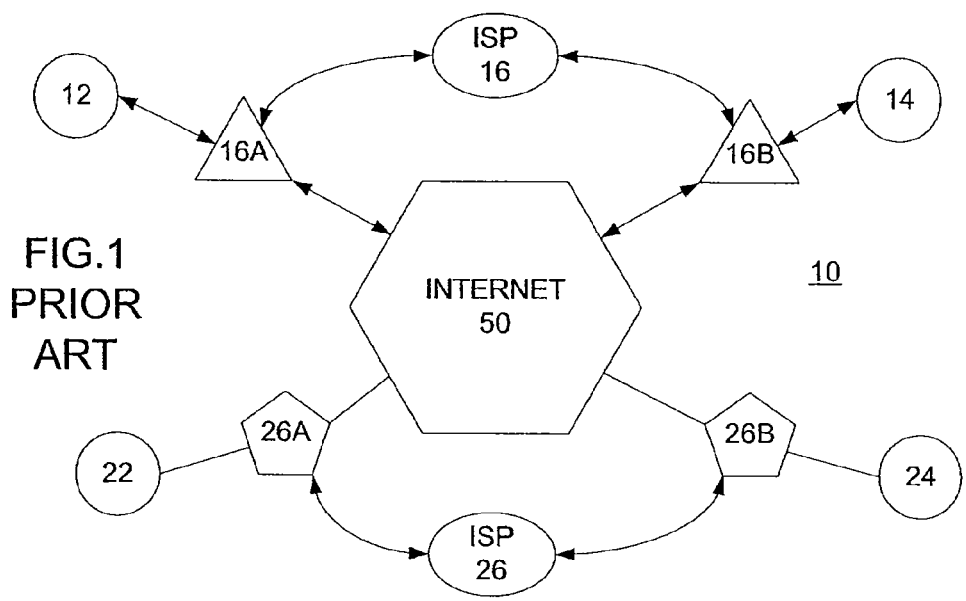
FIG. 1 shows a prior art VOIP system limited to communications between subscribers of specific ISPs.

FIG. 1 is a somewhat simplified block diagram of a prior art VOIP system that provides communication only between the subscribers of the same ISP. More specifically, in system 10, two devices 12, 14 are subscribers of an ISP 16 while two other devices 22, 24 are subscribers of an ISP 26. Gateways 16A, 16B are controlled by ISP 16 and connect devices 12, 14, respectively, to the Internet 50. Similarly, gateways 26A, 26B are controlled by ISP 26 and connect devices 22, 24, respectively, to the Internet 50. The two ISPs 16, 26 have no knowledge of each other's gateway, and do not have any means of handling requests for services that are not within their networks. Therefore, in this configuration, the users of devices 12, 14 can request direct VOIP/VIP communications only between each other or with other subscribers of ISP 16 but not with subscribers 22, 24 of ISP 26. Other voice communication can be established only through external PBXs and/or POTS (these have been omitted from FIG. 1 for the sake of clarity). Devices 12, 14 can be desktop PCs, laptop PCs, PDAs, and various other devices configurable to provide various types of services, including audio, video and text communications.

Figure 2:
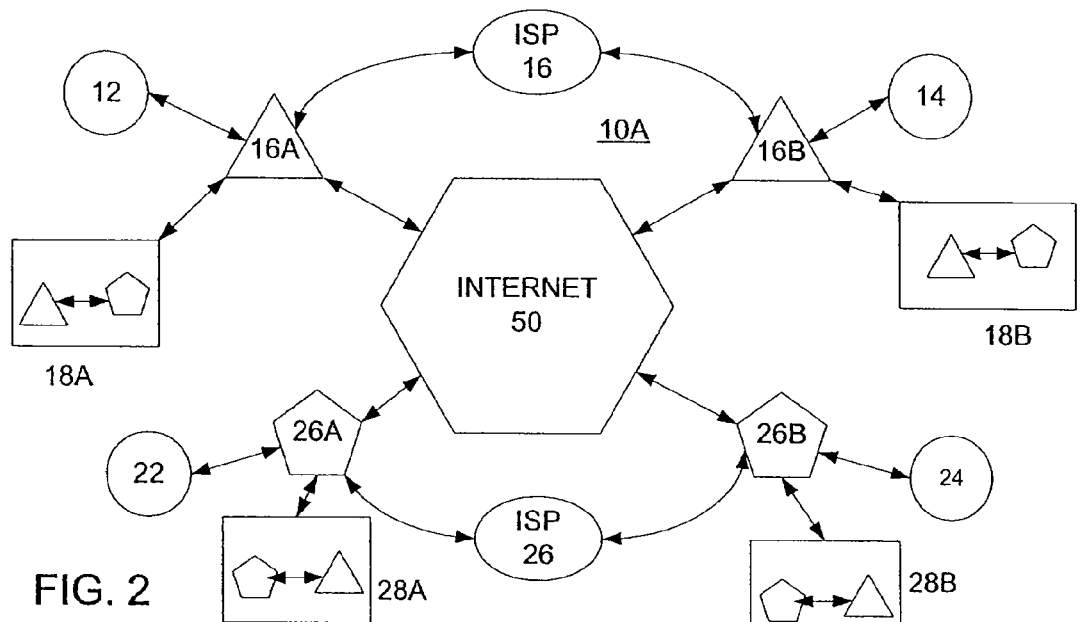
FIG. 2 shows a prior art VOIP system with communication between subscribers of different ISPs.

FIG. 2 shows an improvement over the system of FIG. 1. In this system 10A, the gateways 16A, 16B are connected, respectively, to a data storage system, such as a data server 18A, 18B. Similarly, the gateways 26A, 26B are connected to data servers 28A, 28B. Each data server 18A, 18B, 28A, 28B includes a standard database that holds the information required to provide voice communication between ISP 16 and ISP 26. In this system 10A, a subscriber using device 12 requests voice communication with a user associated with ISP 26. In response to the request, the IP gateway 16A accesses the information on server 18A. At the server, the telephone number of each user is correlated with an appropriate URL address and protocol. The server 18A performs a search of all its entries until the appropriate telephone number is located. The information for communicating with this user is then transmitted back to the gateway 16A. The gateway 16A then contacts the gateway 26A and, using the appropriate protocol, establishes a voice communication link that is then used for voice communication between devices 12 and 22. A similar process is used for calls from subscribers 22 or 24 of ISP 26 to others, including subscribers 12, 14. A problem with this approach is that for each request, servers 18A, 18B, 28A, 28B have to look up each called telephone. Of course, the system can only work if all the subscribers register so their information is stored on the servers. Since, potentially, several hundred million subscribers could access the system, the time required to access the server and find the right information becomes prohibitively lengthy.

Figure 3:
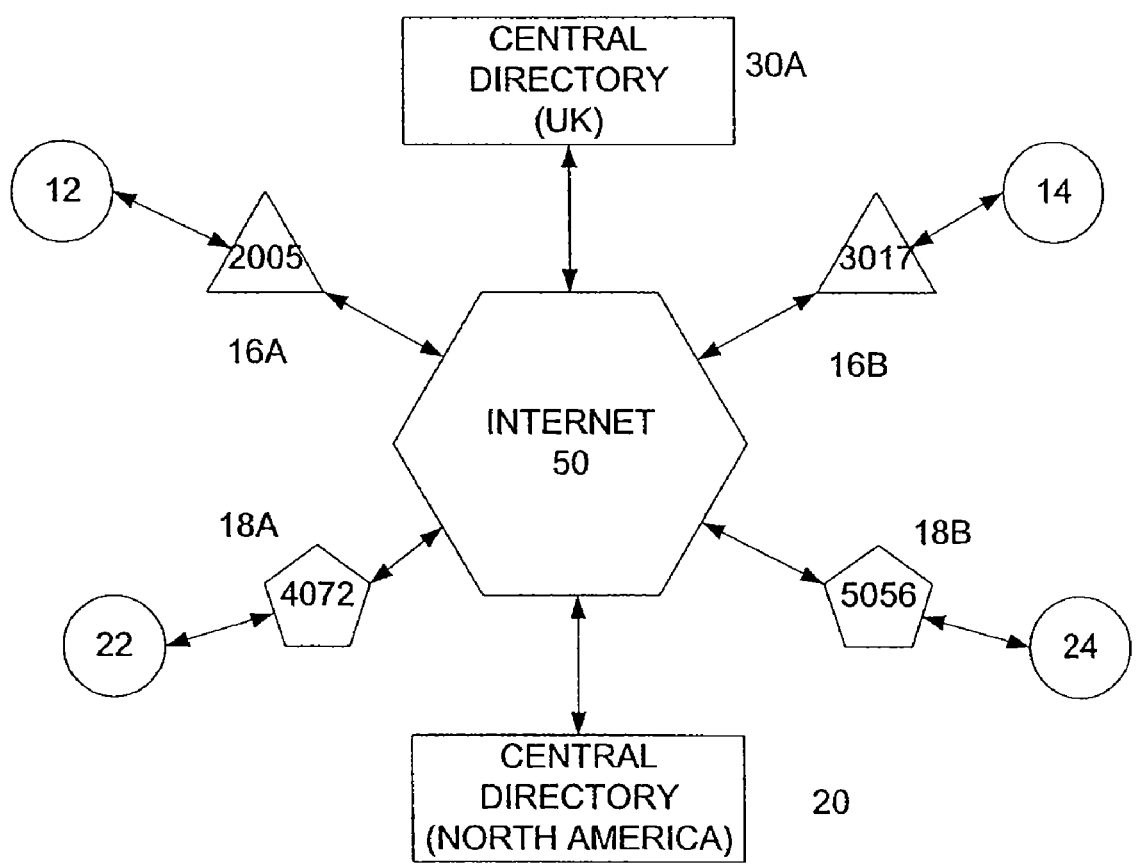
FIG. 3 shows a VOIP system constructed in accordance with this invention.

FIG. 3 shows a novel system (60) for providing voice communication. In this system, the servers 18A, 18B, 28A, 28B in FIG. 2 are replaced with a central directory 20. In the embodiment shown, the directory 20 is accessible by any ISP through a distributed communication network such as the Internet, a private WAN/LAN (Wide Area Network/Local Area Network) or a combination thereof. Alternatively, a directory may be provided for each ISP, in a manner similar to the one shown in FIG. 2. This latter configuration may be less efficient because individual entries for various ISPs are more difficult to update.

The new central directory 20 is used to store information in a very specific manner. This information is provided to allow each ISP to establish prompt voice/video communication with other ISPs or even with itself. Importantly, the ISPs provide this connection seamlessly as far as the users of the devices 12, 14, 22, 24 are concerned. In the same manner the ISPs perform this function independently of the nature and structure of the devices 12, 14, 22, 24.

The present invention makes use of the fact that every communication device (i.e., land-based telephones, cellular telephones, fax machines, and computer-related accessories) is associated with or is assigned a unique number. As illustrated by the table of FIG. 4, all telephone numbers in North America have ten digits (including the area code). Therefore, for North America, the data bank is provided, at least theoretically, with $10^{10}$ addresses arranged in increasing order. For other countries the data bank is established using the local telephone number structure, as discussed in more detail below.

As shown in FIG. 4, in a preferred embodiment, the central directory includes three tables A, B, C. Table A is the main conversion table and exemplifies the entries for the North American phone system. The 10-digit phone number is used as the identifier for each unique entry or data block of the table A. Conventionally, these entries or data blocks are referred to as records, words, or cells of a table. Preferably this table A is implemented as RELATIVE records/words/cells in a RANDOM ACCESS TABLE (RRAT) that is stored as a file parsed internally by a specific byte count called a word, a cell, or a record. Typically, each word, record, or cell is 4 bytes long. This type of table is accessed very fast due to the nature of its structure. More specifically, each entry in the directory is a record, word, or cell that has a unique local address that is used to look up and access the respective entry. In the present invention, this unique local address is the respective 10 digit telephone number of the respective connection or device as discussed before. The number is used either in its original sequence or in another sequence. For example, some of the numbers may be reversed (i.e. 212-555-1234 or 4321555212) to distribute entries more evenly in the table.

In the preferred embodiment, Table A consists of a single entry in any given record/word/cell. Each ISP is assigned one or more gateway numbers. For example, as shown in Table A, the gateway numbers may be 1001, 2005, 3017, etc. . . For the sake of clarity, the entries are shown vertically adjacent to each other; however, in actuality they are not adjacent because there are many interposed entries.

Table B is the ISP gateway conversion table and is used to relate each gateway number to the actual IP address or SIP URL of each of the gateways. For example, ISP gateway number 2005 has the IP address 102.111.222.121. Since each ISP is providing Internet access to a large number of devices (ranging anywhere from several thousands to several millions), the number of ISP gateway numbers and, therefore, the number of entries in Table B is much smaller than the number of entries in Table A.

Table B is also built as a RELATIVE records/words/cells in a RANDOM ACCESS TABLE (RRAT). The record numbers in this table define the ISP gateway number. The data set for each ISP gateway mainly holds the gateway's IP address, an alternate gateway IP address, and/or a gateway SIP URL. The data set for each gateway may consist of additional information, such as the ISP name, a designation of the protocol necessary for the communication, and any additional information required by the specific gateway.

Table C is an optional table that is part of a larger database for the purpose of holding additional information about the phone numbers (i. e. device type—Wireless, VOIP phone, VIP device, PDA, Computer etc. . . ; language, protocol, device capabilities etc. . .). Table C may include several columns relating different parameters.

While an important function of the system described herein is to provide voice communication, it may be used to exchange other types of signals as well, including text (e.g., AIM messages and the like), voice and video clips, and so on. Moreover, if the devices are equipped with video cameras, then the parties could also be engaged in live video conferencing. Additionally, the same system may also be used for conferencing-type of communications wherein several different parties are on the same line and can talk to each other.

Of course, the data set may include various other information as well.

Figure 5:
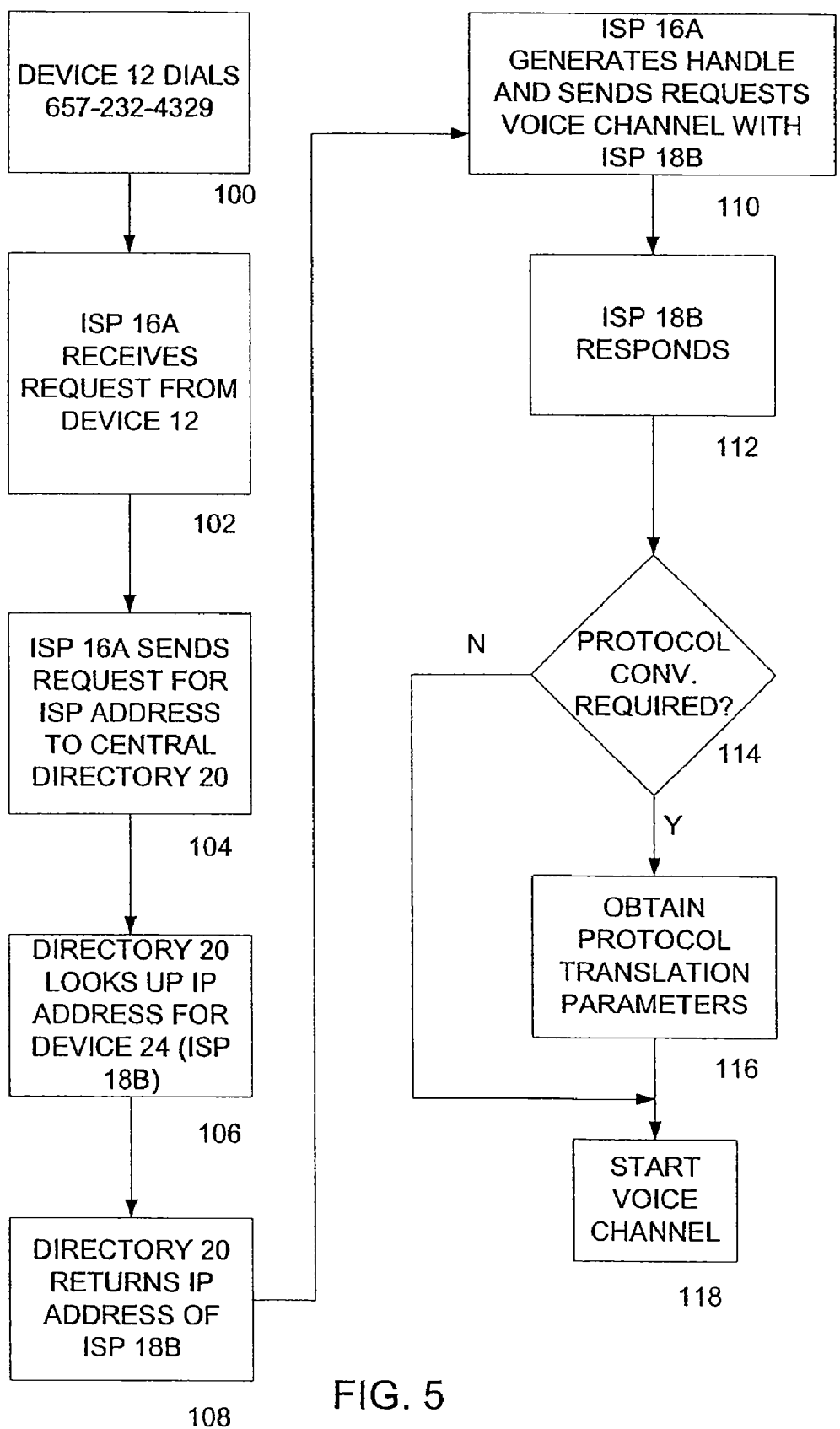
FIG. 5 shows a flow chart illustrating the operation of the system of FIG. 3.

The operation of system 60 is now described in conjunction with the flow chart of FIG. 5 and the tables of FIG. 4. As described above, each device that is capable of providing a voice communication channel over the Internet is designated by a unique telephone number. For example, device 12 may be designated by telephone number 212-999-8000. Internet connection for device 12 is provided by ISP 16A. This ISP is designated in the central directory 20 as ISP 2005 (Of course, the designations of the ISP gateway are arbitrary and 2005 is used herein strictly for illustrative purposes).

FIG. 4 lists other addresses of the central directory with the designation of the respective ISP. For example, address and telephone number 213-342-7623 is serviced by ISP 16B, 317-733-4567 is serviced by ISP 18A, 657-232-4329 is serviced by ISP 18B and so forth. Each ISP provides Internet service to any number of devices. In the example provided, device 24 may be assigned telephone number 657-232-4329 and, therefore, its ISP 18B is designated as 3017.

In step 100 (FIG. 5), a user activates device 12 and requests a voice connection to another device, e.g. 24, by 'dialing' its designated telephone number 657-232-4329. In step 102, the ISP 16A receives the request for the voice channel from device 12. In step 104, the ISP 16A sends a request to the central directory 20 for the ISP of the requested device 24.

In step 106, the directory 20 receives the request and uses the telephone number of device 24 as an address in its data bank, shown in FIG. 4, Table A. The ISP gateway number for ISP 18B is 5056.

In step 107, if the entry for the queried phone number in Table A has no corresponding gateway number, the directory sends back a message to the requesting ISP indicating that it should proceed over the PSTN, and the query ends.

Otherwise, the central directory looks up the ISP address for ISP gateway 5056 in Table B. In step 108, the directory 20 returns the ISP gateway address. Optionally, the central directory 20 also returns any additional information from Table B, such as the alternate gateway IP address.

In step 110, the ISP 16A then uses the information obtained from the central directory 20 and generates an appropriate connection handle. (The connection handle is the identifier used between ISPs to route the call. It may include the originating phone number and IP address etc. . . . ) The ISP 16A then sends a message to ISP 18B, including the connection handle, and requests a voice channel with device 24.

In step 112, the ISP 18B responds to ISP 16A confirming that it is servicing device 24. ISP 18B may provide other information to ISP 16A as well, including a status report as to whether device 24 is presently on-line and available for a conversation.

In step 114, ISP 16A and/or ISP 18B also determine what protocol is being used by ISP 18B and device 24, and whether protocol conversion is necessary (unless this information has been transmitted previously). This information may be obtained from the central directory 20 or from other sources.

If protocol conversion is necessary, the necessary conversion parameters are obtained in step 116. These parameters are used by ISP 16A and/or 18B to translate signals between the two devices to conform with the appropriate protocols.

In step 118, the requested voice channel is established and the two devices can start exchanging voice signals, preferably in a full duplex mode. If the devices 16 and 24 are suited for it, in addition to voice signals, other information may be exchanged including video signals, multi-channel audio signals, etc. . .

In one embodiment of the invention, as mentioned above, Tables A, B, and C are all stored with the central directory. In another embodiment of the invention, Table A, B, and C are stored in each of the individual ISPs 16A, 16B, etc. . .

In FIG. 4, Table B is used to store the additional information associated with the various ISPs, while Table C is used to store the additional information associated with the various individual devices. In an alternate embodiment, Table B is eliminated; and in Table A, every telephone number points directly to an Internet address (either an IP, a SIP, or other similar address) of the corresponding ISP gateway or subscriber.

In the embodiments discussed so far, the central directory is used to provide the addresses of ISPs in North America. The invention can be extended to cover any other country. When this is presented to Table A, assuming that a gateway for that country/ISP exists, the table provides an address for that country's directory service; Directory 30 in this case, or as an alternative, supply the address to the UK's main international gateway.

Numerous modifications may be made to this invention without departing from its scope as defined in the appended claims.

I claim:

1. A system for providing communication between a plurality of devices connected to a distributed computer network, each device being associated with a unique multi-digit telephone number in a series of consecutive multi-digit telephone numbers, said system comprising:
  a plurality of gateways, each gateway (1) providing connection to the network for at least one of said devices and (2) being assigned a unique network address; and
  a directory having a total number of locations equal to the number of possible multi-digit telephone numbers in said series, each location being uniquely identified by a corresponding directory address, each said directory address being assigned uniquely to one of said multi-digit telephone numbers by including into the respective directory address a numerical value dependent on the respective multi digit telephone number;
  wherein each location within the directory includes a network address for the gateway associated with the respective multi-digit telephone number and wherein said directory receives a query (1) from a gateway providing connection to a first device associated with a first multi-digit telephone number (2) for the network address of a second gateway providing connection to a second device associated with a second multi-digit telephone number, said query including said first multi-digit telephone number and said directory returns the network address of the gateway providing connection to said second device.

2. The system of claim 1 wherein said locations include the respective multi-digit telephone number.

3. The system of claim 1 wherein each network address is the unique network address of the respective gateway.

4. The system of claim 1 wherein said directory is implemented as a database with a table having said locations and respective network addresses.

5. The system of claim 4 wherein said directory is further comprised of a second table having a plurality of locations each with a respective data entry, each of the plurality of addresses being uniquely assigned a gateway number in a series of consecutive gateway numbers and each respective data entry including a network address for the gateway number associated with the respective multi-digit telephone number.

6. The system of claim 1 wherein said directory further includes information describing a protocol required to access the respective device and said response to a query includes said information.

7. In a system providing communication between a plurality of devices wherein each device is connected to a distributed computer network through a gateway, each gateway having a unique network address and providing connection between the network and at least one device, and each device being associated with a multi-digit number in a series of consecutive multi-digit telephone numbers, a directory comprising:

a total number of locations equal to the number of possible multi-digit telephone numbers in said series, each location being uniquely identified by a corresponding directory address, each said directory address being assigned uniquely to one of said multi-digit telephone numbers by including into the respective directory address a numerical value dependent on the respective multi digit telephone number, wherein said directory receives a query (1) from a gateway providing connection to a first device associated with a first multi-digit telephone number (2) for the network address of a second gateway providing connection to a second device associated with a second multi-digit telephone number, said query including said first multi-digit telephone number and said directory returns the network address of the gateway providing connection to said second device.

8. The directory of claim 7 wherein said locations include the respective multi-digit telephone number.

9. The directory of claim 7 wherein each network address is the unique network address of a gateway.

10. The directory of claim 7 wherein said directory is implemented as a database with a table having said locations and respective network addresses.

11. The directory of claim 10 wherein said directory is further comprised of a second table having a plurality of locations each with a respective data entry, each of the plurality of addresses being uniquely assigned a gateway number in a series of consecutive gateway numbers and each respective data entry including a network address for the gateway associated with the respective multi-digit telephone number.

12. The directory of claim 11 wherein said directory is further comprised of a third table having a plurality of locations each with a respective data entry, the plurality of addresses including unique numbers for gateway and each respective data entry including additional information related to the respective gateway.

13. The directory of claim 12 wherein said directory includes additional information related to at least one of each said device and a service provider.

14. The directory of claim 12 wherein said additional information identifies a protocol used by a respective gateway to access a network.

15. The directory of claim 7 wherein each said query to said directory is transported through at least one of the Internet and a private network.

16. A method to facilitate communication between two devices over a network using a directory, wherein each device is associated with a corresponding multi-digit telephone number in a series of consecutive multi-digit telephone numbers and is connected to the network through a gateway having a unique ID, said method comprising:

obtaining a request from a first device regarding a second device, said request including the multi-digit telephone number associated with said second device;

identifying in said directory for information to respond to said request, said directory having a total number of locations equal to the number of possible multi-digit telephone numbers in said series, each location being uniquely identified by a corresponding directory address, each said directory address being assigned uniquely to one of said multi-digit telephone numbers by including into the respective directory address a numerical value dependent on the respective multi digit telephone number;

wherein said directory receives a query (1) from a gateway providing connection to a first device associated with a first multi-digit telephone number (2) for the network address of a second gateway providing connection to a second device associated with a second multi-digit telephone number, said query including said first multi-digit telephone number and said directory returns the network address of the gateway providing connection to said second device.

17. The method of claim 16 wherein said response includes the unique ID of the gateway connected to said second device.

18. The method of claim 16 wherein said directory is implemented as a database with a table having said locations and respective network addresses.

19. The method of claim 18 wherein said directory is further comprised of a second table having a plurality of locations each with a respective data entry, the plurality of addresses including said multi-digit telephone numbers and each respective data entry including a network address for the gateway associated with the respective multi-digit telephone number.

20. The method of claim 18 wherein said directory is further comprised of a third table having a plurality of locations each with a respective data entry, the plurality of addresses including unique numbers for gateway and each respective data entry including additional information related to the respective gateway.

21. The method of claim 20 wherein said directory is further comprised of a second table having a plurality of locations each with a respective data entry, each of the plurality of addresses being uniquely assigned a gateway number in a series of consecutive gateway numbers and each respective data entry including a network address for the gateway associated with the respective multi-digit telephone number.

22. The method of claim 20 wherein said directory is further comprised of a third table having a plurality of locations each with a respective data entry, the plurality of addresses including unique numbers for gateway and each respective data entry including additional information related to the respective gateway.

\* \* \* \* \*